Aug. 8, 1967     R. WEINSTEIN     3,334,645
AUTOMATIC VENTING APPARATUS
Filed Sept. 1, 1965
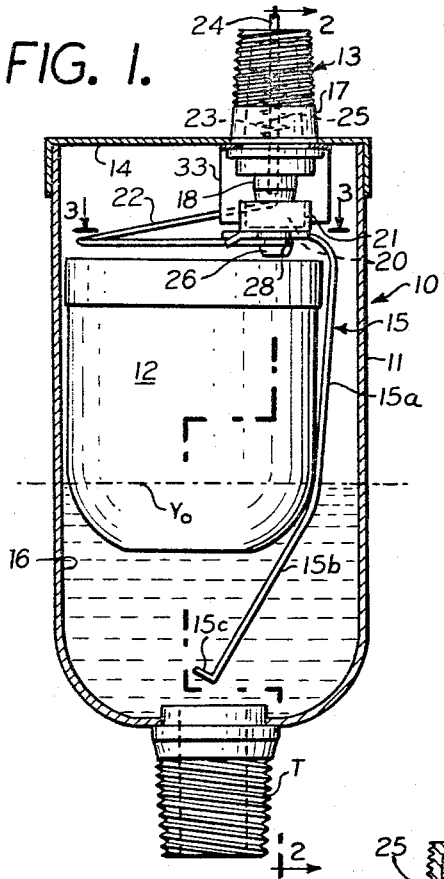
FIG. 1.
FIG. 2.
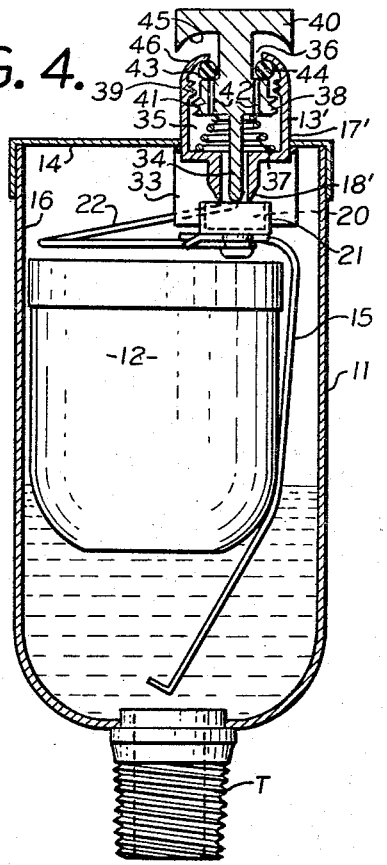
FIG. 4.
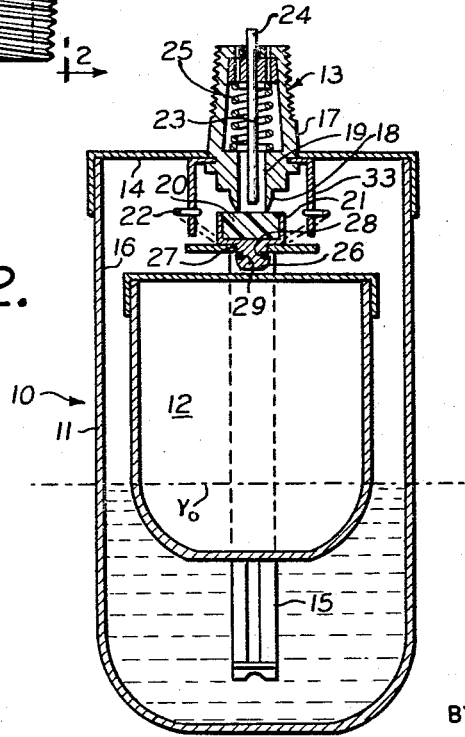
FIG. 3.
INVENTOR
RICHARD WEINSTEIN
BY
Burgess Dinklage & Sprung
ATTORNEYS.

United States Patent Office 3,334,645
Patented Aug. 8, 1967

3,334,645
AUTOMATIC VENTING APPARATUS
Richard Weinstein, Huntington, N.Y., assignor to Flair Manufacturing Corp., Hauppauge, N.Y., a corporation of New York
Filed Sept. 1, 1965, Ser. No. 484,374
11 Claims. (Cl. 137—202)

This invention relates in general to venting devices, such as are used for removing air and other gases from closed liquid systems, and more particularly to a venting apparatus having a gas vent valve which is automatically operated by a float controlled lever arrangement.

The working parts of the venting apparatus according to the invention are substantially enclosed by a float chamber which is flow connected to the liquid system to be vented.

A normally closed valve mounted to the upper portion of the float chamber and extending partially into the interior thereof is provided for venting gases from within said chamber to the ambient atmosphere outside, said venting occurring when the valve is opened.

A lever, disposed within the float chamber and operatively connected to the valve is provided for opening same to vent the chamber when the liquid therein falls below a predetermined level. This is accomplished by providing the lever with means such as for example, bent portions which engage a free float member. The float member is disposed within the chamber between the wall thereof and the lever, and is free to rise and fall with the level of the liquid therein in which it floats. The bent portions of the lever and the external shape of the float member are so constructed that when the liquid in the chamber is below the predetermined level selected for venting, the float member is engaged by the lever and is prevented from being completely supported by the buoyant forces of the liquid. The portion of the float member weight which is not supported by the liquid acts against the lever thereby causing it to open the valve.

When the chamber is vented, the liquid level therein rises until the float member is floated out of engagement with the lever thereby causing the valve to be restored to its normally closed position. Thus, the venting apparatus of the instant invention is automatically operated, and once installed in a liquid system, requires no further attention under normal circumstances.

Among other novel features of the venting apparatus of the invention is its valve seating arrangement wherein a spring clip is used for pressing a silicone rubber pad against the sharp edged face of a tubular seat portion of the valve body which extends into the float chamber. This rubber pad which is mounted to a button member which is in turn fastened to the lever, serves for opening and closing the valve, with the spring clip acting to urge the button and pad against the tubular seat, thereby providing a normally closed valve.

As the float member descends with the liquid level in the chamber, it slides along the lever, gradually pushing said lever in a direction which opposes the force of the spring clip, thereby lifting one side of the pad away from the valve seat to open the valve.

Under normal operating conditions, only one side of the pad will be lifted from the seat when the valve is opened, with the opposite portion of the seat edge remaining in contact with said pad and serving as a fulcrum for the lever and button movement. However, if desired, the spring clip lever, float member and button can be constructed in accordance with the invention so that the pad is lifted completely away from the seat.

According to a preferred embodiment of the invention, the valve is additionally provided with a spring-loaded rod which can be pushed from the outside through the center of the seat to lift the pad away therefrom, so as to permit manual as well as automatic venting operation. In such an arrangement, the rod is spring loaded so as to be normally out of contact with the pad.

One of the advantages of the venting apparatus according to the invention is that the vent valve can be easily fabricated from a conventional tire valve assembly by simply removing the seat plug which is normally attached to an insert member. In the venting apparatus of the invention, the opening and closing of the valve is effected by the pad, and the tire valve insert member, which is actually a slidable spring loaded rod (minus the seat plug) is used for manual venting.

Among the other prominent advantages provided by the venting apparatus of the invention are its free float member and the fastening arrangement of the spring clip, button, and lever.

By using a free float member having no mechanical connection or attachment to any other part, the common problem of jamming which occurred in many prior art venting devices has been eliminated. Also the labor required to assemble the venting apparatus of the invention is considerably less than that required for many other prior art venting devices because of the elimination of complex linkages and the use of snap-in fastenings.

For example, the button is provided with a protrusion which is slipped through a clearance hole in the lever, with the pad being first installed in the button, and the button is lock fastened to the lever by an arcuate portion of the spring clip which slips over a peripheral groove in said button protrusion, in the manner of a conventional snap-ring retainer. The ends of the spring clip are bent so that they can be spread apart and slipped into holes provided in a bracket which can be attached to the inside top portion of the float chamber. Thus, the venting apparatus of the instant invention can be simply assembled without any special tools or skill.

According to another embodiment of the invention, a somewhat different vent valve construction is used. In such embodiment, the valve body has a tubular sharp edged seat portion which extends into the float chamber, and an internal threaded portion which engages a similarly threaded flange on a stem member. This flange is provided with one or more passages for venting gases from the chamber through the normally open top portion of the valve body. In addition to the threaded flange, the stem member is provided with a cap portion which is preferably knurled, so that the stem can be easily turned from moving it in and out with respect to the valve body for selectively opening and sealing the valve manually, or placing it in its normal automatic venting condition.

The stem member is so constructed and arranged with respect to the valve body and the tubular seat thereof that the stem can be rotated into and out of threaded engagement with the valve body. For manual venting, the stem is rotated out of such threaded engagement and pressed inwardly to lift the pad from the seat and thereby open the valve. For automatic venting, the stem is rotated into threaded engagement with the valve body and is thereby axially positioned out of contact with the pad. By rotating the stem for further outward axial displacement, a flange portion of the stem can be brought to bear against an apertured portion in the valve body so as to cover the aperture and thereby seal the valve.

It is, therefore, an object of the invention to provide an apparatus which can automatically vent gases from a liquid system.

Another object of the invention is to provide an apparatus as aforesaid which can be selectively operated to vent such gases either automatically or manually.

Still another and further object of the invention is to provide an apparatus as aforesaid which provides means for selectively venting such gases either automatically or manually and for inhibiting the venting of such gases.

Other objects and advantages of the venting apparatus according to the invention will appear in the following detailed description and accompanying drawings in which:

FIG. 1 is a side elevation view, partly in section, of a venting apparatus according to a preferred embodiment of the invention.

FIG. 2 is another elevation view, partly in section, of the apparatus of FIG. 1, taken along the line 2—2.

FIG. 3 is a sectional view of the apparatus of FIG. 1 taken along the line 3—3.

FIG. 4 is a side elevation view, partly in section, of a venting apparatus according to another embodiment of the invention.

Referring now to FIGS. 1, 2 and 3, the venting apparatus 10 is provided with a chamber 11 for receiving liquid and separable gases from a liquid source (not shown) having such separable gases in admixture with a liquid and for containing such gases as separate from the liquid in free surface equilibrium with the liquid in the chamber 11.

A float member 12 is disposed for limited movement within the chamber 11 along a predetermined path corresponding to the movement of the free surface of the liquid which normally will be a vertical path. The float member 12 is disposed for buoyant engagement with the liquid and is positioned thereby relative to the chamber 11 along said path in corresponding relation to the position of the free liquid surface therein. A valve 13 which serves for venting separated gases from the chamber 11 is disposed in communication with the interior of said chamber 11, preferably at the upper portion 14 thereof where the separated gases will collect. The exact location of the valve 13 on the upper portion 14 of the chamber 11 is not critical so long as the valve 13 does not come into communication directly with the liquid as its free surface rises during the venting of gases from the chamber 11. For this purpose, and for expediency in manufacture and in operation, the valve 13 is preferably located at the point of uppermost elevation on said upper portion.

The valve 13 is preferably a normally closed valve 13 and is operatively connected to a lever 15 which is disposed for operative engagement with the float member 12 at and below a selected position $Y_0$ along the path of float member 12 movement to open the valve 13.

The chamber 11 is connected to the liquid source (not shown) by any suitable conventional means, such as for example, a threaded fitting T, and as contemplated by the invention, such connection to the liquid source is made so that the liquid within the chamber 11 has a sufficient hydrostatic pressure that when the valve 13 is opened, the free surface of the liquid within the chamber 11 will rise to a level which floats the float member 12 out of engagement with the lever 15 to restore the valve 13 to its normally closed state. Such hydrostatic pressure is also essential to expel the separated gases within the chamber 11 when the valve 13 is opened.

Thus, the venting apparatus 10 provides for automatically venting separated gases from the chamber 11 since whenever such separated gases from the liquid source (not shown) accumulate to an extent within the chamber 11 that the free surface level of the liquid therein is depressed so that the float member 12 is positioned at or below the point $Y_0$, and thereby engages the lever 15, the valve 13 is opened and the gases are expelled therethrough by the action of the rising liquid until the float member 12 is freely supported by the liquid, which occurs when the free liquid surface rises a corresponding distance above the point $Y_0$.

One of the advantageous features afforded by the invention is that the float member 12 need not be physically connected to the lever 15 or to any other element in order to effect the automatic venting action. While it is true that the lever 15 is disposed so as to laterally constrain the movement of the float member 12 in order to prevent said float member 12 from assuming a lateral position relative to the lever 15 where it will be ineffective to actuate said lever 15 in response to changes in the free surface liquid level in the chamber 11, such a lever 15 and float member 12 arrangement requires no physical connection therebetween, but will perform the intended function merely by abutting contact engagement between the lever 15 and float member 12.

As is shown in FIGS. 1 and 2, the lever 15 has a first bent portion 15a disposed for operative engagement with the float member 12 at the position $Y_0$ to partially open the valve 13, and a second bent portion 15b contiguously adjoining the first bent portion 15a and disposed for operative engagement with the float member 12 at positions below $Y_0$ to further open the valve 13. The lever portions 15a and 15b are disposed in cooperating relation to each other and with respect to the wall 16 of the chamber 11 so as to constrain the lateral movement of the float member 12 to a predetermined region bounded laterally by lever 15 and the wall 16, and yet permits said float member 12 free vertical movement with the free liquid surface. An additional bent portion 15c which is inclined preferably at an angle of approximately 90° with respect to the bent portion 15b, is provided adjoining the end of the portion 15b to prevent the float member 12 from slipping downward between the lower portion 15b and the wall 16 to the extent where it becomes jammed therebetween so as to render it ineffective for automatic venting purposes.

It has been found satisfactory for the generally cylindrical, rounded bottom, float member 12 illustrated in FIGS. 1 and 2, to construct the lever 15 so that its first bent portion 15a is preferably inclined at an angle of approximately 5° with respect to the upright wall 16 (and also the lateral surface of the cylindrical float member 12), so as to provide an optimum leverage to enable the float member 12 to overcome the inertia of the lever 15 and valve 13 in initially displacing said valve 13 from its normally closed position to a partially opened condition. The second portion 15b of the lever 15 is preferably bent at an inclination of approximately 25° with respect to the extension of the first portion 15a, so that once the lever 15 has been displaced slightly to "crack" open the valve 13, the float member 12 will rest upon the portion 15b and thereby more rapidly displace the lever 15 for further opening the valve 13.

As the separated gases escape from the chamber 11, and the liquid level therein rises, the lever 15 will normally aid the float member 12 in rising with the liquid, since the lever 15 is operatively connected to the valve 13 which is spring-biased into the opposite direction to the float member 12 movement which effects opening of the valve 13, because said valve 13 is normally closed.

The valve 13 includes a valve body 17 having a tubular edged seat member 18 disposed for communication with the interior of the chamber 11 and defining a venting passage 19 extending through the valve body 17, and a resilient closure member 20 which is supported in a button-like holding member 21, and is disposed in operative engagement with the sharp edge of the tubular seat member 18. The closure member 20 is preferably made in the form of a silicone rubber pad so as to be capable of suitable deformation without cutting when normally pressed into engagement with the sharp edge of the seat member 18 by a spring clip 22 to maintain said valve 13 in a normally closed state. The closure member 20 normally executes a pivoting movement in relation to the seat member 18, when it is moved by a lever 15 against the influence of the spring 22 to open the valve 13 and when it is moved by the spring 22 to close said valve 13, with a portion of the edge of the seat member 18 serving as a fulcrum for such pivoting movement in both cases.

Depending upon the elastic constant of the spring 22, and the effective force exerted upon the lever 15 by the float member 12, the closure member 20 may also execute a combined translation and pivotal rotation with respect to the seat member 18 when the valve 13 is opened.

In most practical applications of the venting apparatus 10 according to the invention, it will be desirable to provide the manually operable, or override gas venting capability therefor which enables the valve 13 to be opened for gas venting independently of the automatic venting operation already provided. Accordingly, in its preferred embodiment, the invention provides a spring-biased stem member 23 which is disposed through the valve body 17 for operative pushing engagement with the closure member 20 to displace said closure member 20 away from the seat member 18 and thereby open the vent passage 19 of the valve 13. For external manual operation, the stem member 23 is provided with a protruding portion 24 which extends outward beyond the valve body 17. When the stem member 23 is pushed inward against the influence of the spring 25 which tends to keep said stem member 23 out of contact with the closure member 20, so as not to interfere with the normal automatic venting function, the stem member 23 engages the closure member 20 pushing it away from the seat member 18 against the effect of the spring clip 22.

While in general, any valve 13 which will meet the aforesaid functional requirements can be used in the apparatus 10 of the instant invention, a conventional tire valve can be expediently modified for such purpose.

It should be noted that the movement of the stem member 23 is a necessarily limited axial movement relative to the valve body 17, both as to its inward and outward displacements, since a relatively small stem 23 motion will suffice for displacing the closure member 20 for effective gas venting.

As can be more clearly seen by FIG. 3, together with FIGS. 1 and 2, the resilient closure member 20 is supported in a holding member 21 having a grooved projecting member 26 disposed through an aperture 27 in the lever 15. The spring clip 22, which is actually a generally W-shaped, bifurcated wire spring clip 22, has a centrally disposed arcuate retainer portion 28 disposed in operative engagement with the groove 29 on said projecting member 26, so as to fasten the holding member 21 and lever 15 together and simultaneously provide an operative connection between the spring clip 22 and the closure member 20. The outer legs 30 of the spring clip 22 are bent inwardly as at 31 to engage into holes 32 provided in a bracket 33 affixed to the upper portion 14 of the chamber 11. If desired, the bracket 33 can be affixed to the valve body 17 directly since it does not matter so long as one end of said spring clip 22 is operatively connected with the valve 13, but this operative connection need not be necessarily directly thereto, so that the intended result of maintaining a normally closed valve 13 is achieved.

As exemplified by FIG. 4, the detail construction of the valve 13 can be varied as per the modified valve 13', wherein a distinctly different type of stem member 34 is used to provide for both manually opening and effectively closing the valve 13' independently of its automatic venting mechanism.

For such purpose, the valve 13' is constructed with an internal hollow portion 35, somewhat similar to that in the valve 13, said hollow portion 35 being in communication with the tubular seat member 18' and provided with an aperture 36 for externally venting gases passed through the seat member 18' into the hollow portion 35. As in the case of the valve 13, the stem member 34 is spring-biased, as by the conical spring 37 so as to be normally out of contact with the closure member 20, and said stem member 34 is disposed through the valve body 17' for limited axial movement relative thereto along a predetermined path, preferably a path coaxial with the tubular seat member 18'. The stem member 34 is provided with a threaded portion 38 disposed for operative engagement with a similarly threaded portion 39 on the valve body 17', but is capable of being rotated into and out of such threaded engagement by manually rotating its cap member 40.

The operation of the stem member 34 can be best explained by considering it to be initially out of threaded engagement with the valve body 17' as illustrated in FIG. 4, since in such condition the stem member 34 can be manually displaced against the effect of the conical spring 37 so as to push against the closure member 20 to open the valve 13', regardless of the free liquid surface level in the chamber 11. In this respect, the stem member 34 functions the same as the stem member 23 in the valve 13. It should be noted that when the stem member 34 is out of threaded engagement, its threaded portion 38 and the threaded portion 39 on the valve body 17' are so arranged in relation to the normally closed position of the closure member 20 that in the absence of any inward pushing force on the cap member 40, the conical spring 37 will hold the stem member 34 out of contact with the closure member 20 so as not to interfere with automatic venting.

To permit normal automatic gas venting, the flange portion 41 of the stem member 34 which bears the threaded portion 38 is provided with flow passages 42 to permit the escape of gases from the hollow portion 35 of said valve body 17' and out through the primary vent aperture 36.

By rotating the stem member 34 in threaded engagement with the valve body 17' and in a direction which causes the flange 41 to advance outward, until the upper surface 43 of said flange 41 is positioned so as to deform the seal ring 44 so that it completely obstructs the flow passages 42 and/or the main aperture 36, the valve 13' can be effectively sealed in a closed condition regardless of whether the closure member 20 is in the open or the closed position.

If desired, by suitably arranging the flow passages 42 in relation to the primary vent aperture 36, the seal ring 44 can be omitted.

The cap member 40 of the stem member 34 is provided with a curved under surface 45 disposed in externally adjacent relation to the aperture 36 so as to deflect the flow of gases vented therethrough and thereby prevent any of such gases, which may be hot and any liquid carried therewith from coming in contact with the top portion of the cap member 40 where it is manually pressed. This is a desirable safety feature especially where hot water heating systems are to be vented, since upwardly directed hot gases and water vapor could otherwise cause injury to a person attempting to perform the manual venting or sealing of the valve 13'.

Upon first impression, the valve assembly 13' might appear to be impossible to construct in a practical manner, because of the inwardly curved peripheral wall 46 of the valve body 17' which would apparently prevent the assembly of the stem member 34, seal ring 44 and conical spring 37. However, such is not the case, and in accordance with the invention, the valve body 17' which is preferably made of a deformable metal such as brass, aluminum, etc. is initially constructed with the cylindrical wall 46 straight so as to prevent the installation of the stem member 34, seal ring 44 and conical spring 37. The stem member 34 is constructed of a harder and stronger material such as steel, so that its curved under surface 45 can be utilized as a crimping die for inwardly flaring the wall 46 to the configuration shown in FIG. 4.

This inward flaring of the wall 46 can be simply accomplished by rotating the stem member 34 out of the threaded engagement with the valve body 17', so as not to strip the threads of either, and inserting the valve body 17' and installed stem member 34 into a pressing device (not shown) so as to force the curved under surface 45 downward to deform the wall 46 into the crimped, or inwardly flared shape of FIG. 4.

Hence, aside from this latter fabrication step, which results in a substantially tamper-proof valve 13′, no special tools are required to assemble the venting apparatus 10 once the valve 13 or 13′ has been affixed to the upper portion 14 of the chamber 11, together with the bracket 33 or other means for holding the spring clip 22. After assembly of the venting apparatus 10, the joint between the upper portion 14 and the remaining portion of the chamber 11 can be soldered for secure gas and liquid tight sealing.

What is claimed is:

1. An apparatus for venting gases from a liquid source wherein separable gases are in admixture with the liquid, which comprises a chamber disposed for communication with said liquid source to receive separated gases therefrom, and to receive liquid from said source in free surface equilibrium with such separated gases within said chamber, a float member disposed for limited movement within said chamber along a predetermined path, said float member being disposed for buoyant engagement with said liquid within said chamber to be positioned thereby along said path in corresponding relation to the position of the free surface of said liquid with respect to said path, a valve means disposed in communication with the interior of said chamber for venting said separated gases therefrom, said valve means being normally closed, and a lever means operatively connected to said valve means to open same, said lever means extending downwardly adjacent and below said float member and arranged to be contacted by the lower portion of said float member after a predetermined fall of the float member so as to open said valve, said lever means being arranged to closely confine the float member between it and a side wall of the chamber, whereby whenever the free surface of the liquid within said chamber is disposed to position said float member at or below said selected position, the valve means is opened to permit the escape of separated gases from said chamber.

2. The venting apparatus according to claim 1 wherein said valve means includes a valve body having a tubular edged seat member disposed for communication with the interior of said chamber and defining a venting passage through said valve body, a resilient closure member disposed in operative engagement with said tubular edged seat member to effectively open and close said venting passage, and spring means operatively connected to said closure member and operatively connected with said valve body for urging said closure member into a normal position of operative engagement with said seat member to close said vent passage.

3. The apparatus according to claim 1 wherein said lever means has a first bent portion disposed for operative engagement with said float member at said selected position along the path of movement thereof to partially open said valve means, and a second bent portion contiguously adjoining said first bent portion disposed for operative engagement with said float member at positions below said selected position on said path to further open said valve means, said first and second bent portions of said lever means being disposed to constrain the movement of said float member in directions transverse to said path.

4. The apparatus according to claim 1 wherein said valve means includes a valve body having a tubular edged seat member disposed for communication with the interior of said chamber and defining a venting passage through said valve body, a resilient closure member disposed in operative engagement with said tubular edged seat member to effectively open and close said venting passage, and spring means operatively connected to said closure member and operatively connected with said valve body for urging said closure member into a normal position of operative engagement with said seat member to close said vent passage, and wherein said lever means has a first bent portion disposed for operative engagement with said float member at said selected position along the path of movement thereof to partially open said valve means, and a second bent portion contiguously adjoining said first bent portion disposed for operative engagement with said float member at positions below said selected position on said path to further open said valve means, said first and second bent portions of said lever means being disposed to constrain the movement of said float member in directions transverse to said path.

5. The apparatus according to claim 2 including a spring-biased stem member disposed through said valve body for operative engagement with said resilient closure member to open said valve means independently of said lever means, said stem member being normally biased out of operative engagement with said closure member and having a portion disposed for manual engagement external of said valve body to position said stem member in valve opening engagement with said closure member.

6. The apparatus according to claim 2 including a spring-biased stem member disposed through said valve body for a limited axial movement relative thereto for operative engagement with said resilient closure member to open said valve means independently of said lever means, said stem member being normally biased out of operative engagement with said closure member and having a portion disposed for manual engagement external of said valve body to position said stem member in valve opening engagement with said closure member.

7. The apparatus according to claim 2 wherein said valve body has an internal hollow portion in communication with said tubular seat member, and an aperture in communication with said hollow portion for externally venting gases passed thereto through said tubular seat member, and including a spring-biased stem member disposed through said valve body for limited movement relative thereto along a predetermined path for operative engagement with said closure member to open said valve means independently of said lever means, and for operative engagement with said aperture to close said valve means independently of said lever means, said stem member being normally biased out of operative engagement with said closure member, said stem member having a threaded portion disposed for operative engagement with a similarly threaded portion on said valve body for positioning said stem member relative thereto along said path to operatively engage said aperture to seal same and thereby close said valve means independently of said lever means, said stem member being disposed for rotation relative to said valve body about said stem movement path for selectively positioning the threaded portion of said stem member out of engagement with said threaded portion of the valve body for movement against said normal spring bias to operatively engage said closure member to open said valve means, whereby said normally closed valve means can be opened by said lever means in response to the positioning of said float member by the liquid within said valve chamber, and said valve means can be selectively opened and effectively closed by said stem member independently of said lever means.

8. The apparatus according to claim 2 wherein said resilient closure member is supported by a holder member having a grooved projecting member disposed through an aperture in said lever means, and wherein said spring means includes a spring clip operatively connected with said valve body, said spring clip having arcuate retainer portion disposed in operative engagement with grooved projecting member to fasten said holder member and said lever means together, and to operatively connect said spring clip to said lever means and said closure member.

9. The apparatus according to claim 7 including a resilient seal ring member disposed in surrounding relation to said stem member and to said aperture to aid in the sealing of said aperture by said stem member.

10. The apparatus according to claim 7 wherein said stem member is provided with a cap member for manually pressing said stem member into operative engagement with said closure member to open said valve means, and for rotating said stem member relative to said valve body to seal said aperture by said stem member, said cap member having a curved surface disposed in externally adjacent relation to said aperture to deflect the flow of gases vented through said aperture and thereby prevent such gases and any liquid carried therewith from coming into contact with the manual pressing portion of said cap member.

11. The apparatus according to claim 7 wherein said resilient closure member is made of silicone rubber.

References Cited
UNITED STATES PATENTS

| | | | |
|---|---|---|---|
| 492,597 | 2/1893 | Way | 137—202 |
| 2,198,291 | 4/1940 | Poe | 137—202 |
| 2,633,142 | 3/1953 | Woolley | 127—202 |
| 2,751,925 | 6/1956 | Axlander | 137—202 |
| 3,099,286 | 7/1963 | Powers | 137—448 X |

ALAN COHAN, *Primary Examiner.*